(12) United States Patent
Overby

(10) Patent No.: US 7,110,751 B1
(45) Date of Patent: Sep. 19, 2006

(54) MULTI-PHONE PROGRAMMING APPLICATION

(75) Inventor: Terry A. Overby, Garland, TX (US)

(73) Assignee: CellStar, Ltd., Coppell, TX (US)

( * ) Notice: Subject to any disclaimer, the term of this patent is extended or adjusted under 35 U.S.C. 154(b) by 139 days.

(21) Appl. No.: 10/708,726

(22) Filed: Mar. 19, 2004

(51) Int. Cl.
*H04M 3/00* (2006.01)

(52) U.S. Cl. .................. 455/418; 455/419; 455/557

(58) Field of Classification Search ............ 455/418, 455/419, 557
See application file for complete search history.

(56) References Cited

U.S. PATENT DOCUMENTS

| | | | |
|---|---|---|---|
| 5,297,191 A | 3/1994 | Gerszberg | 379/59 |
| 5,491,740 A | 2/1996 | Ellis et al. | 379/58 |
| 5,603,084 A | 2/1997 | Henry, Jr. et al. | 455/33.1 |
| 5,754,954 A | 5/1998 | Cannon et al. | 455/419 |
| 5,887,253 A | 3/1999 | Oneil et al. | 455/418 |
| 5,926,756 A * | 7/1999 | Piosenka et al. | 455/418 |
| 5,974,311 A * | 10/1999 | Lipsit | 455/418 |
| 6,029,143 A | 2/2000 | Mosher et al. | 705/28 |
| 6,223,028 B1 | 4/2001 | Chang et al. | 455/419 |
| 6,393,408 B1 | 5/2002 | Mosher et al. | 705/28 |
| 6,487,403 B1 * | 11/2002 | Carroll | 455/419 |
| 6,889,058 B1 * | 5/2005 | Tordera | 455/557 |
| 2003/0162533 A1 * | 8/2003 | Moles et al. | 455/419 |

* cited by examiner

*Primary Examiner*—Nick Corsaro
*Assistant Examiner*—Jaime Holliday
(74) *Attorney, Agent, or Firm*—Daniel N. Lundeen; Lundeen & Dickinson, LLP

(57) ABSTRACT

Automated Provisioning of radiotelephone handsets at a fulfillment center and automated quality assurance are disclosed. The provisioning uses a computer database of specifications for authentication and activation from multiple handset manufacturing vendors, radiotelephone service providers, and distributors. A universal interface system is provided to efficiently access diverse makes and models of handsets. The handsets are attached to the interface system in accordance with a build request, checked to see if the attached handset matches the build request, and automatically provisioned via the interface in accordance with the build request.

22 Claims, 21 Drawing Sheets

Administrator Setup Tables

Phone Setup Table ─ 70
- Manufacturing Vendor Name
- Phone Model/Name/Number
- Phone Technology
- Software Version

Item Number Setup Table ─ 74
- Item Number
- Customer Name
- Vendor Name
- Model Name/Number
- Phone Graphic
- BREW Ready
- MIN
- MDN
- SCM
- Vcoder
- Browser IP

Customer Setup Table ─ 72
- Customer Name
- Customer Address
- Book Number

User Setup Table ─ 76
- User Name
- User Role
  - Administrator
  - Manager
  - Operator

*FIG. 2*

Start Application Software
Function Select and Access Authorization

Administrative Setup
Main Screen

Operator Application - Production

Please select the Build Request Number:
[ ▼ ]

Attach a MMMM XXXX to the data cable.

The system has detected that the wrong phone is attached to the data cable, please remove the current phone and attach a MMMM XXXX.

*Continuing from Fig. 6, a user logs in to the operator application phase, and enters a Build Request Number to begin processing inventory.*

*The application software requests a phone handset unit to be attached, where MMMM is the Manufacturer of the phone and XXXX is the model of the phone.*

*The phone is automatically detected by the application. Attachment of an incorrect phone draws a prompt to the operator...*

The correct phone is now attached, please wait while the files are received.

50%

*...upon correct connection of the requested handset, the provisioning transfer proceeds...*

FIG.15A

Operator Application - Quality Assurance

Please select the Build Request Number:
[ ▼ ]

Continuing from Fig. 6, a user logs in to the operator application phase, and enters a Build Request Number to begin processing inventory.

The operator is prompted to select a Build Request for QC checking...

Attach a MMMM XXXX to the data cable.

...and to attach a handset unit for the QC evaluation.

The correct phone is now attached, please supply the below information

Please scan the ESN from the phone box.

The QC program requests a scan of the phone's packaging...

The correct phone is now attached, please supply the below information

Please scan the ESN from the back of the phone.

...and the handset itself to verify the electronic serial number.

*FIG. 16A*

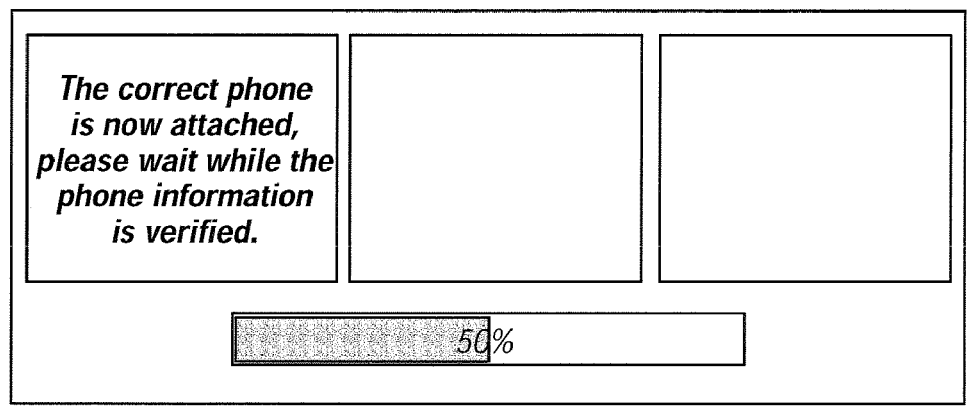
When the attached unit is confirmed in the Build Request, the provisioned data files are checked against the database...
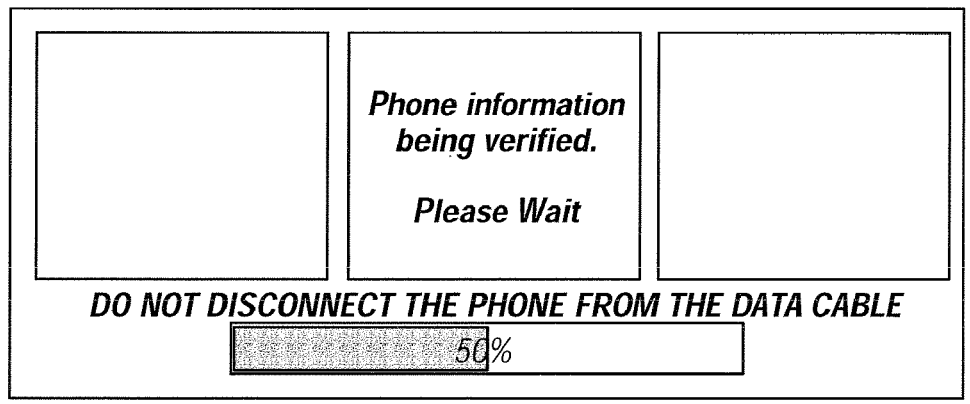
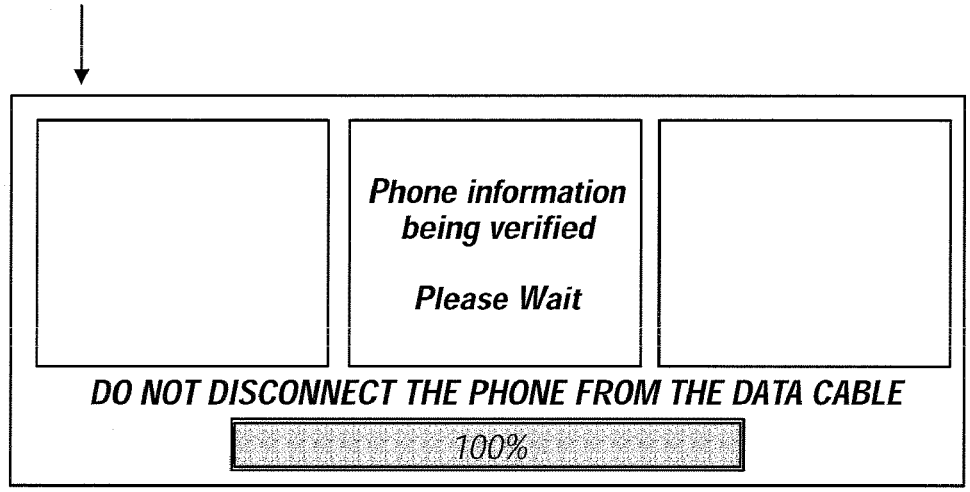
...and the part number is verified...
Is the box labeled with part number NNNNNN?
● Yes   ○ No
↓   FIG.16B

The next phone set for QC testing is requested, and the testing protocol continues as above, until...

When the final phone is checked, this screen will appear. The system will then go back to the beginning of the QA section for the selection of another Build Request Number.

MULTI-PHONE PROGRAMMING APPLICATION

BACKGROUND OF INVENTION

This invention relates generally to automating the provisioning process for distribution of wireless radiotelephone handsets, and particularly to methods and apparatus for provisioning handsets to meet customer specifications for handsets and communication services. The methods especially limit the need for human interfacing in the process and provide automated quality assurance to control product quality.

Rapid growth has characterized various telecommunication industries, most especially the mobile telephone industry. Because of this rapid growth, there are now many different manufacturers of the radiotelephone handsets used in the mobile phone industry. In addition to the multiple manufacturers, there are also multiple service providers or carriers. To further complicate matters, each carrier can use a different and incompatible mobile phone technology to power its network. Today, there are approximately 10 radiotelephone handset manufacturers, at least 4 major service providers, and at least 4 different technologies for mobile phones. This makes it especially complicated to get phones provisioned properly such that all necessary information required by either the radiotelephone handset seller or the service provider. Manufacturing technology steadily expands the numbers of handset models and arrays of selectable handset features. Similarly, telecommunication service providers adapt features of broadcast systems and business practices to accommodate available hardware features, including differentiating services based on geographic and temporal factors. The services must address both legacy hardware and newly emerging hardware. And distributors of handset packages and service agreements order a wide diversity of handsets and service options to sell, based on marketing needs.

Radiotelephone handsets are typically provisioned at different stages in manufacture, distribution, and use to install data for phone operation with diverse service network functions. A provisioning process is, in part, a sequence of operations for encoding reference data and program routines into radiotelephone handsets (hardware). This enables and authorizes the handsets to communicate via one or more telecommunication systems (services), and makes available handset features for the user to access service features. Provisioning typically requires different processes specific to many different hardware types and service systems, and each provisioning process is typically done piecemeal. Therefore, the work of provisioning is complex and demanding of key resources, especially of human direction and input. Provisioning steps typically occur in vendor factories, in service centers, and at distributor outlets, culminating in some tasks required of the user, i.e. the ultimate customer.

Accordingly, methods and systems are highly valued that can improve provisioning efficiencies while accommodating ongoing changes in the process. U.S. Pat. No. 5,603,084 to Henry, U.S. Pat. No. 6,223,028 to Chang, U.S. Pat. No. 5,297,191 to Gerszberg, and U.S. Pat. No. 5,754,954 to Cannon each teach systems for remote, one-on-one programming of radiophones, for use at point-of-sale by a retailer or post-sale by an end-user.

U.S. Pat. No. 5,491,740 to Ellis provides a mechanical device programmed to physically enter key strokes into handsets for selecting phone and carrier features.

U.S. Pat. No. 5,926,756 to Piosenka, U.S. Pat. No. 5,974,311 to Lipsit, and U.S. Pat. No. 6,487,403 to Carroll each provide computer-controlled, one-on-one programming of telecommunication devices for network operation at their points-of-sale.

U.S. Pat. Nos. 6,029,143 and 6,393,408 to Mosher and U.S. Pat. No. 5,887,253 to O''Neil teach systems to inventory and distribute pre-packaged and/or pre-programmed phone sets for various manufacturing vendors and cellular service providers. Additionally, the Mosher patents disclose the possibility of a programming step as part of the inventory and distribution system.

There remains in the field a need for an improved method of provisioning radiophone handset with data and programs for activation and operation. The improved method encompasses more automation and less human interaction while still maintaining the ability to provision handsets made by a variety of manufacturers for use by many different service providers.

SUMMARY OF INVENTION

In this text the terms phone, radiophone, and radiotelephone are used interchangeably. "Handset unit" is synonymous with these terms. The invention provides a method and apparatus for provisioning radiotelephone handsets in which one preferred embodiment is a software application comprising methods and apparatus for provisioning radiotelephone handsets. The invention provisions multiple radiotelephone handset types with minimal user interaction, gathering and loading information into the radiotelephone handsets automatically. The multi-phone provisioning application is typically networked, so that administrative and management users can load shared application information with customer and handset specifications at either a remote computer terminal or the local computer controlled provisioning interface. Once the necessary data is entered by an administrator or manager, the invention then allows an operator to automatically provision multiple radiotelephone handsets with minimal user interaction. As a separate optional step, the invention has a built in quality control verification step that can automatically verify and monitor the provisioned radiotelephone handsets for meeting specifications.

One embodiment of the invention provides a universal provisioning system for radiotelephone handset units of varying model, manufacturer, and technologies. The system includes an interface having at least one universal connector adapted for connection to radiotelephone handsets having different specifications. A computer is operably connected to the interface, and memory storage in communication with the computer contains provisioning and instruction data for a specified radiotelephone handset connected via the interface. The system includes software for verifying connection of the specified handset and automatically transferring the provisioning data to handset memory storage via the interface in accordance with instruction data.

The universal provisioning system can include additional workstations operably connected via metallic wire, radiofrequency communication, infrared communication, fiber optic cable, and the like, and combinations thereof.

The memory storage can be random access memory, non-volatile hard drive storage, non-volatile flash memory, volatile flash memory, removable magnetic media storage, optical storage, magnetic tape storage media, EEPROM memory, and the like, and combinations thereof.

The provisioning data can include roaming instructions, user features, number assignment module settings, browser and short message service settings, phone book entries, date book entries, message settings, carrier specific settings, user specific settings, and the like, and combinations thereof.

The instruction data can include production build request number, quantity of phones to provision, carrier type, customer identification data, starting part number, final part number, handset manufacturer, handset technology type, handset model number, and the like, and combinations thereof.

Another embodiment of the invention includes an automated method of provisioning radiotelephone handset units. The method includes: (a) generating a build request comprising a radiotelephone handset specification and provisioning and instruction data for the specified handset; (b) storing the build request in a memory storage medium in communication with a computerized provisioning system; (c) retrieving data from the build request; (d) connecting the provisioning system to a handset in accordance with the build request specification; and (e) automatically transferring the provisioning data to memory storage of the connected handset in accordance with the instruction data.

Another preferred embodiment of the invention includes an automated method of provisioning a plurality of radiotelephone handset units. The method includes: (a) generating a plurality of build requests comprising radiotelephone handset specification data and provisioning and instruction data for the specified handset; (b) storing the build requests in a memory storage medium in communication with a computerized provisioning system; (c) selecting an available one of the build requests from the storage medium; (d) displaying handset specification data from the selected build request; (e) connecting the provisioning system to a handset in accordance with the specification data display; (f) querying the connected handset via the provisioning system to compare connected handset specification data with the build request specification data; and (g) automatically transferring the provisioning data to memory storage of the connected handset in accordance with the instruction data.

The generating and storing can be performed on a workstation networked with the computerized provisioning system. The generating step can also include: (1) entering a production build request number; (2) entering a quantity of phones to provision; (3) selecting a carrier type; (4) selecting a customer; (5) entering a starting part number; (6) entering a final part number; (7) selecting a handset manufacturer; (8) selecting a handset technology; (9) selecting a handset manufacturer's model number; (10) any combination thereof; or the like.

The retrieving step can also include: (1) selecting a production build request number; (2) displaying the final part number; (3) displaying the handset manufacturer; (4) displaying the handset manufacturer's model number; (5) displaying an image of the handset; (6) displaying the customer name; (7) any combination thereof; or the like.

The handset specification data that can be displayed includes the final part number, the handset manufacturer, the handset manufacturer's model number, the customer name, or the like, or any combination thereof.

The querying can include: (1) communicating with the handset; (2) determining the manufacturer and model number of said handset; (3) comparing the connected handset''s manufacturer and model number with the requested manufacturer and model number; (4) allowing the operator to continue to connect a different handset based on the result of the comparison; (5) a combination thereof; or the like.

The generating and storing steps can be performed by a manager or someone other than an operator.

The method can also include inspecting the memory storage of the handset to verify provisioning data integrity. The inspecting typically includes: entering a production build request number; connecting the handset according to the build request data associated with the production build request number; comparing the provisioning information in the memory storage of the handset to the provisioning data associated with the production build request number; marking the handset with a passing indicator if the provisioning information matches the provisioning data; repeating the connection, comparison, and marking on the remaining handsets described by the production build request number; determining whether the production build request passes or fails based on the instruction data associated with the production build request number and returning a pass/fail for the production build request; sending failed handsets from a passing production build request to a repair station; and sending all handsets from a failing production build request to an area for segregation. Additionally, the data gathered from the inspecting step is stored to a storage medium either digitally or in hard copy to generate reports based on the data.

BRIEF DESCRIPTION OF DRAWINGS

FIG. 2 shows illustrative administrative database tables used to store various provisioning information for the provisioning system of FIG. 1.

FIGS. 15A, 15B, and 15C together show a series of menu screens used as part of the Provisioning aspect of the Operator Application process to provision the radiotelephone handsets using existing information already loaded into the application software of FIG. 6 according to one embodiment of the present invention.

FIGS. 16A, 16B, 16C, and 16D together show a series of menu screens used as part of the Quality Assurance aspect of the Operator Application process to verify the provisioning data is correctly loaded into the radiotelephone handsets using existing information already loaded into the application software of FIG. 6 according to one embodiment of the present invention.

DETAILED DESCRIPTION

Figure 1:
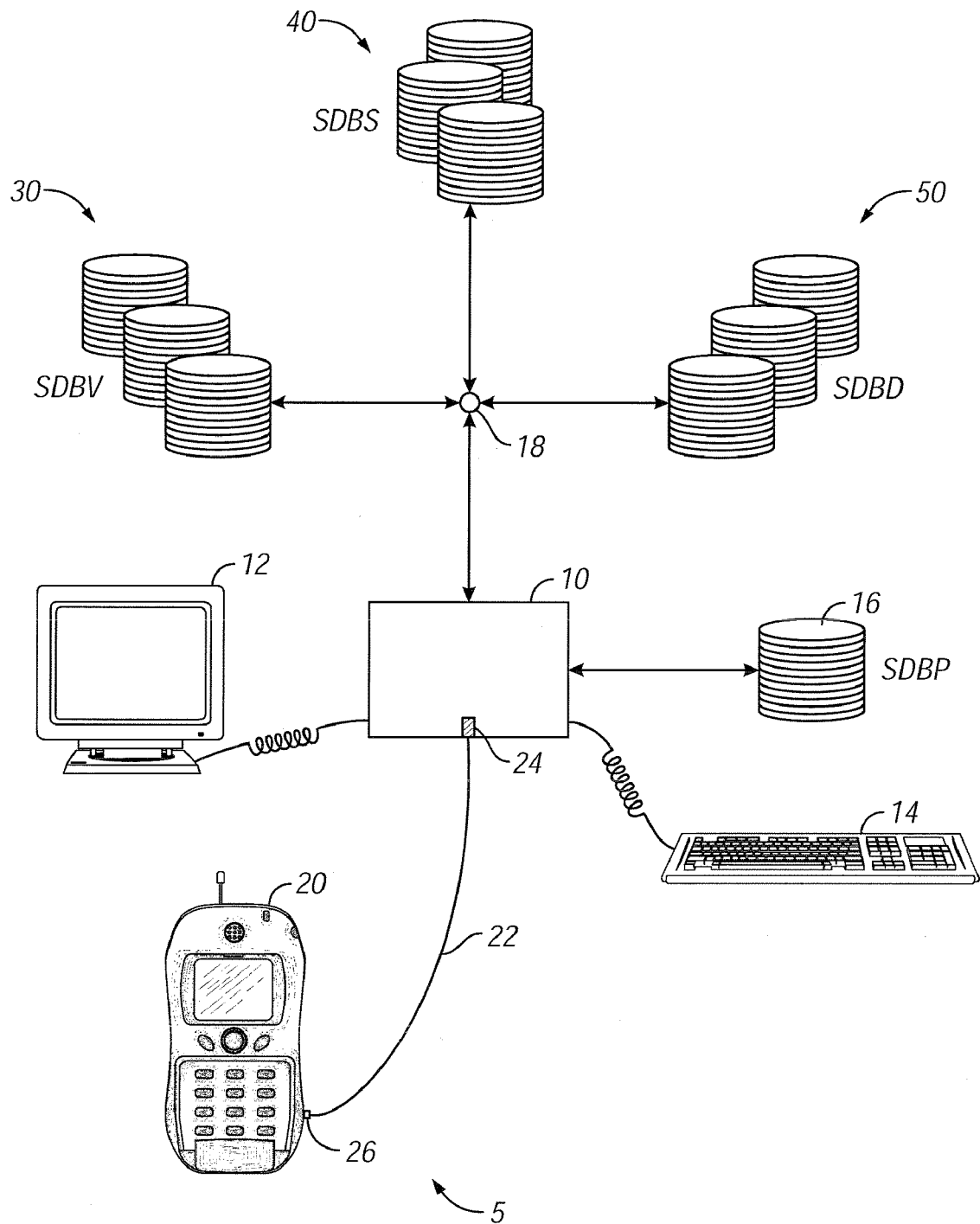
FIG. 1 is a system schematic for provisioning radiotelephone handsets according to one embodiment of the present invention.

In one preferred embodiment shown in FIG. 1, a provisioning system 5 includes a networked, computer-controlled provisioning interface 10 that has a video display interface 12 and user input interface, e.g. a keyboard 14, for interaction with an operator. The provisioning interface 10 includes the provisioning Application Database (SDBP) 16, into which provisioning reference data is imported and formatted for provisioning use. The reference data is obtained via a network 18, for example a local or wide-area network (LAN, WAN) or the internet. The provisioning system 5 downloads the reference data from other storage databases (SDBV) 30, (SDBS) 40, and (SDBD) 50 owned respectively by multiple radiophone vendors, phone service providers, and distributors, who may subscribe to be served by the provisioning system 5.

A radiotelephone handset unit 20 that is to be provisioned is connected to the provisioning interface 10 using a standardized interface connector 22 such as a Universal Serial Bus (USB) interface. The USB interface 22 connects to the provisioning interface 10 using a conventional USB connector 24, and preferably connects to the handset 20 in a similarly standardized connector 26. The USB interface 22 preferably maximizes compatibility between handset outlets 26 and provisioning interface outlets 24.

The invention is enabled for multiple platforms to be compatible with available cellular phone technology, for example including TDMA, CDMA, GSM, 2G, 2.5G, 1RXX, 3G, UMTS. The invention will also be adaptable to other standards as they become available. The provisioning of handsets makes use of existing telecommunication standards, including IS-136, IS683a, IS-707, IS-95, IS-94. Evolving standards will be adopted as they are implemented.

Additionally, the invention contemplates multiple types of universal connectors. The most popular and universal connector known in the art today is the USB connector. Possible connectors currently available in the art include male USB Type A connector, male USB Type B connector, male Mini USB connector, male Mini USB 2.0 connector, male 4-pin IEEE-1394 connector, male 6-pin IEEE-1394 connector, female USB Type A connector, female USB Type B connector, female Mini USB connector, female Mini USB 2.0 connector, female 4-pin IEEE-1394 connector, female 6-pin IEEE-1394 connector and combinations thereof. USB refers to the USB-IF supported USB specifications currently available and all future derivations and revisions of the specifications. IEEE-1394 refers to the IEEE foundation's specification number 1394 and all future revisions, derivations, and modifications of this specification.

The invention can use one or more connectors of mixed types. For example, a system could use both a USB and IEEE-1394 connector simultaneously if one handset type required each connector. The important advantage this provides to the invention is the ability to readily adapt to any new connectors as they become standardized and readily available in this art.

The invention can adopt other configurations well known in computer networking technology including a single stand-alone system. For example, the provisioning interface 10 can act as a server to multiple networked work stations equipped as described above for handset provisioning. Alternatively, an installation can employ multiple provisioning interfaces, with or without respective work stations.

The manager setup tables of a preferred embodiment are used by a production manager to compile customer purchase orders termed Build Requests in the provisioning system. The Manager Tables include records listing handset manufacturing vendor names and respective vendor handset technologies; vendor model names and model numbers; customer names (radiotelephone service providers), customer address book numbers, and carrier types; and operator identification and provisioning interface identification. The Manager Setup Tables are compiled by collecting the provisioning data files and program files for the vendors and customers from common access. The invention facilitates the compilation by a user over the network 18 shown in FIG. 1, accessing the subscriber databases SDBV 30, SDBS 40, and SDBD 50.

The Application Collected Tables of a preferred embodiment (not shown) also include data entries for a Quality Assurance (QA) protocol. Quality Assurance is used to maximize provisioning efficiencies and, ultimately, customer satisfaction and convenience. For example, an Electronic Serial Number (ESN) that is programmed into each handset of each Build Request is recorded in three database cells corresponding to initial data entry of the Build Request, an automated scan upon provisioning the handset, and an automated scan of the handset for Quality Assurance. Such comparative data collection permits provisioned radiotelephone handsets to be closely tracked for conformance with Build Request specifications.

The provisioning database 16 uses a foundation comprised of Administrator Setup Tables outlined in FIG. 2. The Administrator Tables include reference data for Phone Setup 70 identifying vendors, phone makes and models, their technologies and operating software; Customer Setup 72 listing customer (service provider) identities and address references; Item Number Setup 74 cataloguing a cross reference that associates a vendor's model of phone with a customer name and provisioning information for storage in the respective phone handsets; and User Setup 76 naming personnel authorized to access the database to enter data into and use the provisioning system. Data entered in the Administrator Tables is accessed through the Manager Tables.

The provisioning methods of a preferred embodiment use programming techniques well known in information technology arts to program the Application Flow Phases for automated execution of provisioning. Any suitable programming technique can be utilized depending on the particular skill of the person implementing the program. The Application Phases store, collect, and transfer provisioning database information to initialize memory modules in various particular phone handsets, using vendor-specific and carrier-specific files and information. The Application Flow Phases comprise these particular phases of program routines: (a) Administrator Setup Phase, which is an information input task listing recognized vendors and customers; (b) Manager Build Setup Phase, which is an information input task defining customer Build Requests; (c) Operator Application Phase, which is an information transfer task to provision handsets for fulfilling customer Build Requests; and (d) Quality Assurance Phase, which is a verification task to check and record whether the Operator Application phase has properly fulfilled Build Requests that were processed.

The Administrator Setup Phase of a preferred embodiment is used to enter or edit data in the Administrator Setup tables. This invention can be used to program any phone for which data is included in the database 16. Therefore, the Phone Setup table 70 of FIG. 2 is populated with data defining each phone model to be provisioned. For each radiotelephone handset service provider who is a customer of a provisioning center using this invention, the Customer Setup table 72 is completed for identifying the respective customers. Customers may designate that their Build Requests can be fulfilled using a plurality of makes and models of radiophone handsets. For each such designation an Item Number Setup table 74 will be completed, giving cross-reference data linking the customer with specific phone models, and specifying appropriate provisioning information for the respective phone model to operate in the customer's service network. The User Setup table 76 identifies in-house personnel at the distribution center who are authorized to use the database 16 for data entry or product provisioning.

Figure 3:
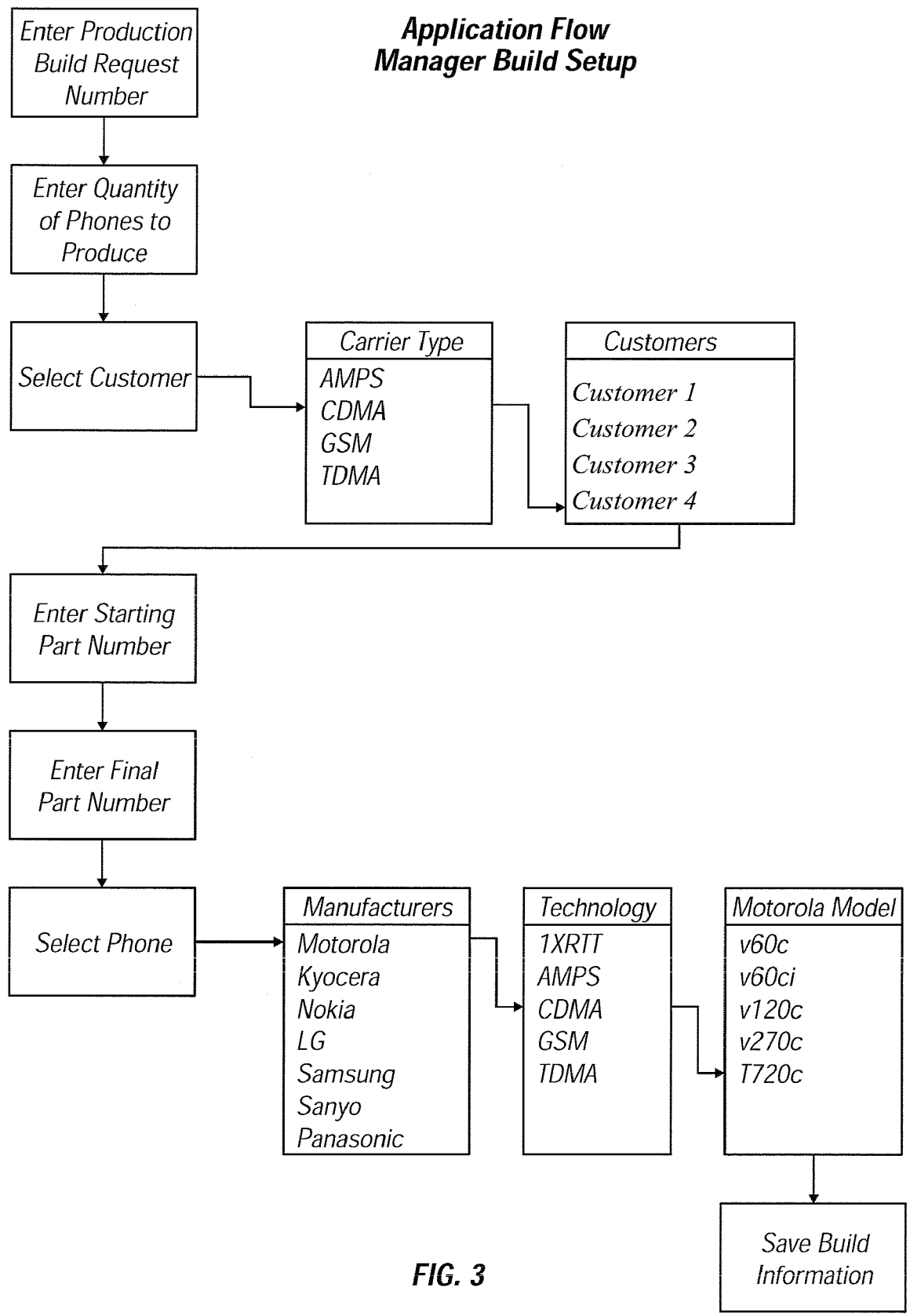
FIG. 3 is a flow diagram for a manager build setup to generate production build requests according to one embodiment of the present invention.

The Manager Build Setup Phase of a preferred embodiment comprises entering data to the Manager Setup Tables of the provisioning database 16 to define a Build Request. The sequence of data input is illustrated in FIG. 3. The Manager Setup Tables automatically pick up data from Administrator Setup Tables corresponding to data identifying customers, vendors, and phone models. The data typically entered by a user for a Build Request includes: production Build Request Number (PBR); quantity of phones to produce; customer selection of carrier type and customer ID; part number range; phone selection of manufacturer, technology, and model; Service Provider Codes, which can be pre-assigned by the manufacturer and/or service provider and/or randomly generated, e.g. Initial and Final Service Provider Code; Authentication Key or Keys, which can be pre-assigned by the manufacturer and/or service provider and/or randomly generated, e.g. Initial and Final Authentication Key.

Figure 4:
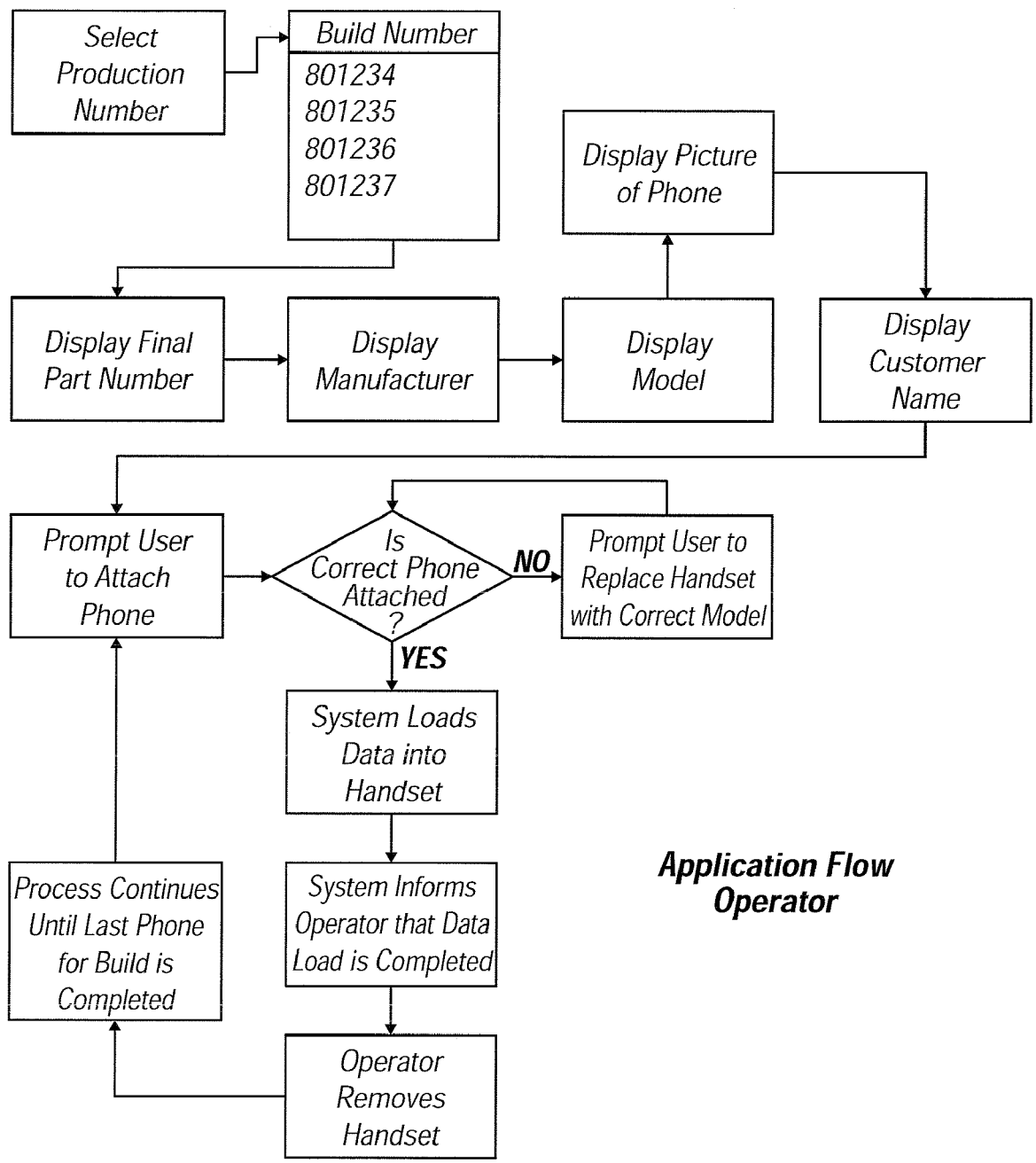
FIG. 4 schematically shows operator interactions with a provisioning interface for provisioning radiotelephone handsets according to one embodiment of the present invention.

The Operator Application Phase of a preferred embodiment comprises interactions between a production assembly operator and the Application Flow program routines through a provisioning interface. FIG. 4 illustrates the flow logic for Operator Application. The operator identifies Build Requests to be processed, and the programs prompt the operator to select, connect/disconnect, and route respective handsets, by referencing the database 16 for specifications appropriate to the particular Build Request numbers. While a phone is connected to the system, the programs collect and download provisioning information to the handsets. The cycle is repeated, and the operator continues the handset selection process in fulfilling a Build Request.

Additionally, the method has the capability to generate, capture and/or use the Service Programming Code (SPC) of each handset. The Service Programming Code is a code that is used to protect the phone from unauthorized programming. The SPC can be unique for each individual phone or common to a whole group of phones, depending on service provider preference. The Service Programming Code is also known by many other names in the industry including, but not limited to Master Sublock (MSL), Subsidy Programming Code, Lock Code, and Carrier Lock Code. The handset is usually provided with a default or pre-assigned SPC by the manufacturer, which can be reprogrammed according to the service provider requirements during the provisioning process.

The automated method also has the ability to generate, capture and/or use the Authentication Key. The Authentication Key (A-Key) is an encryption code used by some radiotelephone handset service providers to ensure that an individual handset is authorized for service on the radiotelephone handset service provider's network. The A-Key can be unique for each individual phone or common to a whole group of phones, depending on service provider preference. The handset is usually provided with a default or pre-assigned A-key by the manufacturer, which can be reprogrammed according to the service provider requirements during the provisioning process.

Figure 5:
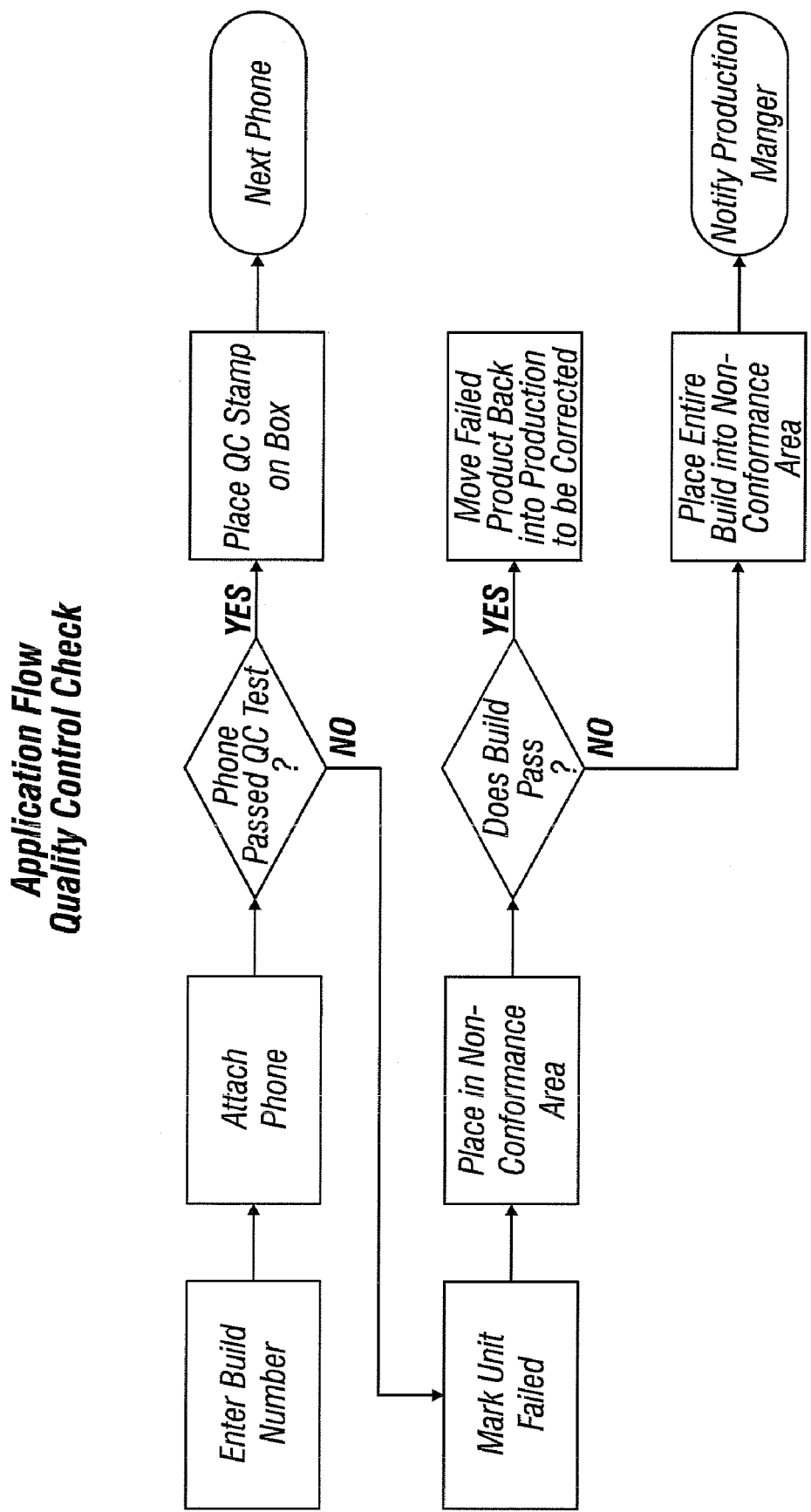
FIG. 5 is a flow scheme for a quality control process for verifying provisioning of radiotelephone handsets according to one embodiment of the present invention.

The Quality Assurance ("QA") Phase of a preferred embodiment entails evaluating the accuracy of fulfillment of the Build Requests, using a work station to check phones processed in the "Operator Application" phase. FIG. 5 illustrates a Quality Control ("QC") Check sequence that implements the QA Phase, which typically flows as follows: Enter Production Build Request; System instructs which phone to connect; Operator attaches handset; Query phone memory data followed by determination of pass/fail status; if the handset passes, the handset is QC-stamped, packaged, released, and the process repeats itself for the next handset; If the handset fails, the handset is marked as such and diverted to a non-conformance area and the process repeats itself for the next handset; upon all required handsets from a given build request being tested, the system determines whether the build passed or failed; if the build passes, the non-conforming handsets are recycled back into production to be corrected; if the build fails, all handsets, both conforming and non-conforming handsets are placed in a non-conformance area for management action.

The QA phase of the preferred embodiment will determine the build pass/fail using ANSI Quality tables for inspection based off ANSI Z 1.4 and includes any future modifications, revisions, or superseding industry standard specifications for inspection.

The QC check in the QA phase of a preferred embodiment uses Application Phase program routines resident in the computer-controlled provisioning system. The QA programs record conformance of the provisioning with Build Request specifications, and also record measurements of completeness of data installation according to specifications in the Manager Setup Tables. The QA protocol maximizes the delivery of compliant products, thereby minimizing costs for re-handling units returned by customers because of defective programming. Handsets can be checked individually or in mass batches corresponding to Build Requests. The provisioning interfaces can serve as both provisioning and QA sites. Thus, complete Build Requests can be processed at a single installation, using any station or a plurality of stations.

Although a preferred embodiment uses the specific steps above to enter, store, and maintain the data required for the system to operate, the key elements of the invention that are offer the unique advantages of the current invention are described below.

The invention has no specific data requirements as the data requirements will depend on the given client or enterprise and how it desires to provision the radiotelephone handsets. There is a minimum requirement that the invention have some form of provisioning information. Provisioning information typically comprises provisioning data and instruction data. The provisioning method of this invention can program any radiotelephones for which desired instruction data and provisioning data is available and a compatible universal connector is installed in the provisioning interface.

Any method that uses some or all of the provisioning information described herein to automatically provision radiotelephone handsets is within the scope and spirit of the invention.

Instruction data can include information required to provision the phones. This information can include some or all of the following information: production build request number, quantity of phones to provision, carrier type, customer identification data, starting part number, final part number, handset manufacturer, handset technology type, handset model number, and the like, or a combination thereof.

Provisioning data can include information required to provision the phone with all specific data and settings required for a given radiotelephone handset carrier. This information includes: roaming instructions, user features, number assignment module settings, browser and short messaging service settings, phone book entries, date book entries, message settings, carrier specific settings, user specific settings, default SPC; final SPC, default A-Key, final A-key, and combinations thereof.

The provisioning data collected for this invention can be obtained from a plurality of information sources including but not limited to handset vendor databases and telecommunication service provider databases. The provisioning information is also consolidated into a plurality of records comprising collected data matched to respective build requests. It is important to note that while one preferred embodiment contemplates the uses of databases for storing and collecting various data, other sources of information suitable for the particular client needs would also be appropriate.

While one preferred embodiment comprises the methods embodied in Application Flow Phases detailed above, other possible combinations of the required steps are within the scope and spirit of this invention. The Flow Phases described above organize provisioning data and automate data transfer for high efficiency and accuracy. Another aspect of the inventive methods described above coordinate the provisioning of inventories of diverse radiophone handsets from multiple manufacturing vendors with the required diverse provisioning data from multiple phone service providers. This combination of organization, automation, and coordination improves the business of product delivery for both the vendors and service providers.

Thus, the inventive provisioning system represents an improvement over existing telecommunication hardware programming systems. This invention is highly automated, and it provides the ability to automatically provision handsets to varying customer specifications on a wide variety of radiotelephone handsets by different manufacturers. In addition, the system provides an automated Quality Assurance process to control production and distribution of products with high levels of conformance. Furthermore, the system is not specific to any particular service provider, technology, or connector specific such that it can readily adapt to the ever changing radiotelephone handset market.

Examples The following examples depict portions of one possible application used to implement the inventive apparatus and method. While this software application is particularly suited for the invention, this is not the only suitable embodiment contemplated by the invention and what is claimed.

EXAMPLE 1

The following tables depict portions of the Application Database 16. Table 1 illustrates an example of content in an Administrator Setup Table showing the User Setup Table. Table 2 illustrates part of an Item Number Setup Table. Table 3 illustrates part of a Manager Build Request Setup Table. Table 4 illustrates a first portion of an Application Collected Table for the Operator Phase, and Table 5 illustrates a second portion of an Application Collected Table, focusing on data for QA Phase results.

EXAMPLE 2

Figure 6:
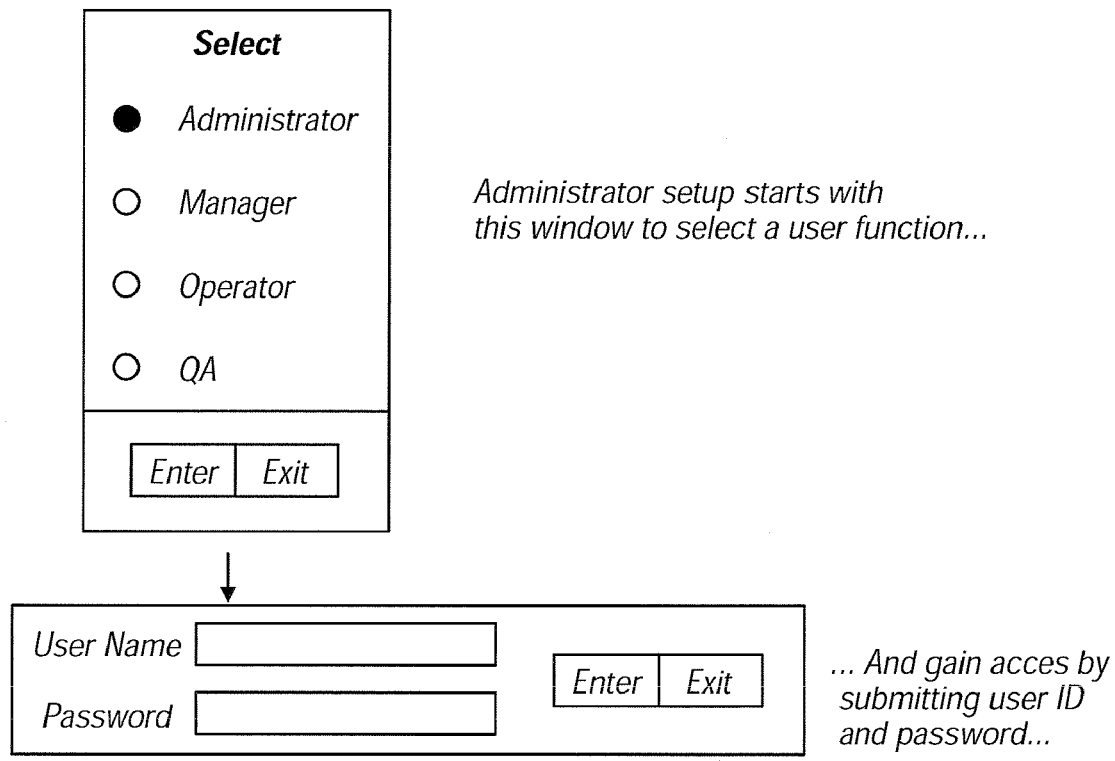
FIG. 6 shows a typical function select and access authorization screen for the application software according to one embodiment of the present invention.

This example illustrates the flow logic for performing Administrator Setup in the application software that automatically guides users through the processes of this invention. As shown in FIG. 6, the first screen encountered is "Start Application Software," which will direct a user into a mode of operation for administrative input, management input, or operator application to either provision radiophone handsets or to perform the QA verification of provisioned products. To start and use the application software, the user must enter a name and password.

Figure 7:
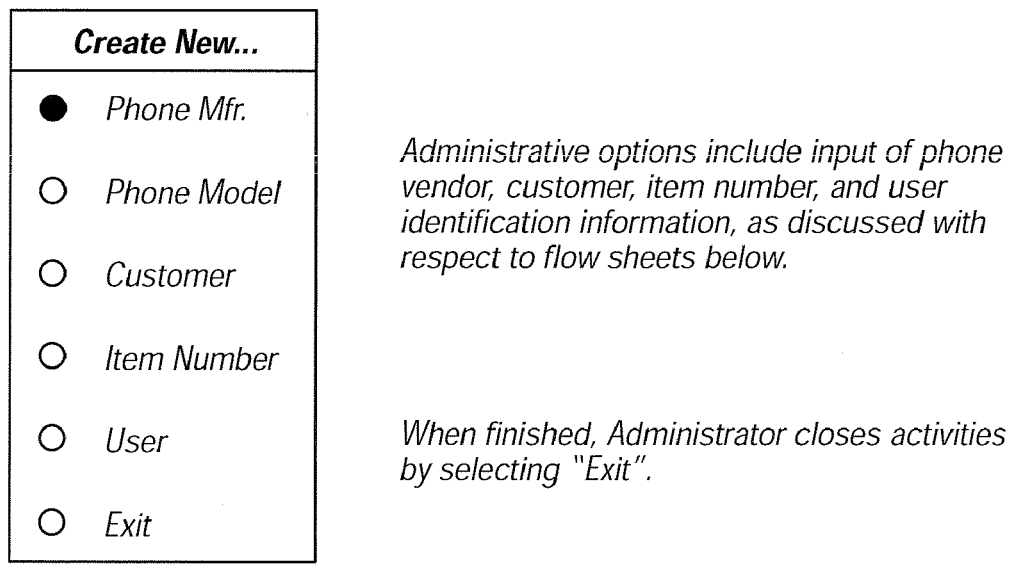
FIG. 7 shows an administrative setup main screen for the application software of FIG. 6 according to one embodiment of the present invention.
Figure 8:
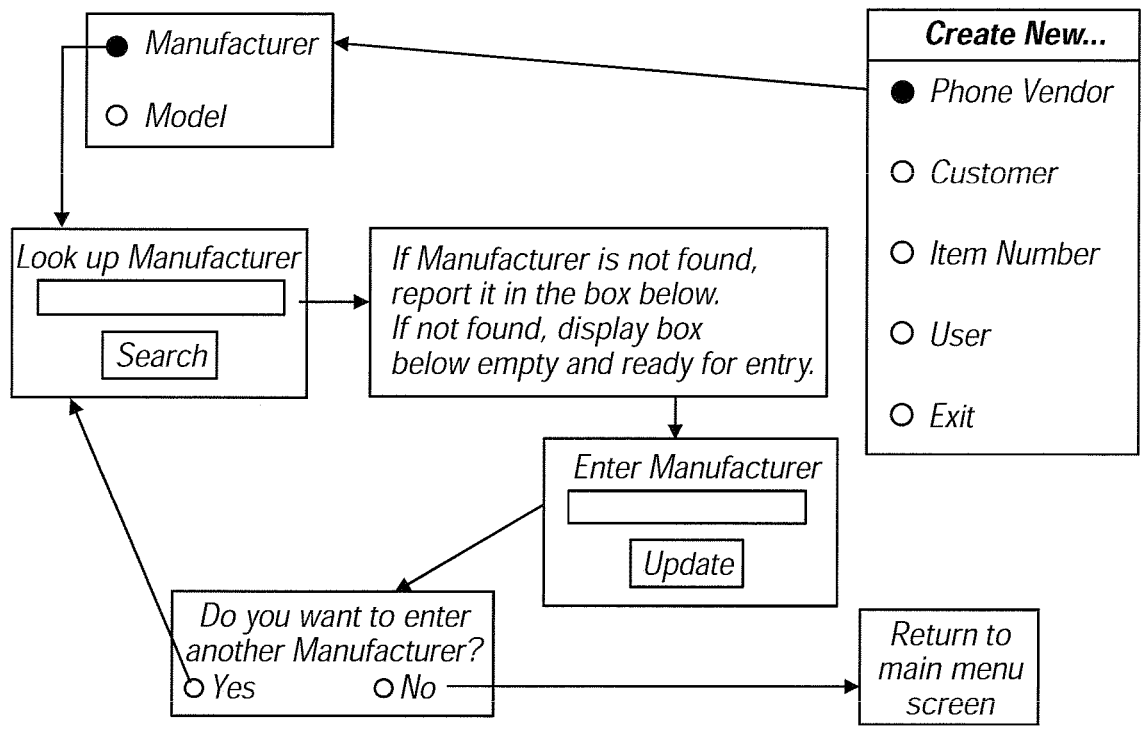
FIG. 8 shows a series of menu screens used as part of the Administrator Setup process for entering radiotelephone handset manufacturer information into the application software of FIG. 6 according to one embodiment of the present invention.
Figure 9:
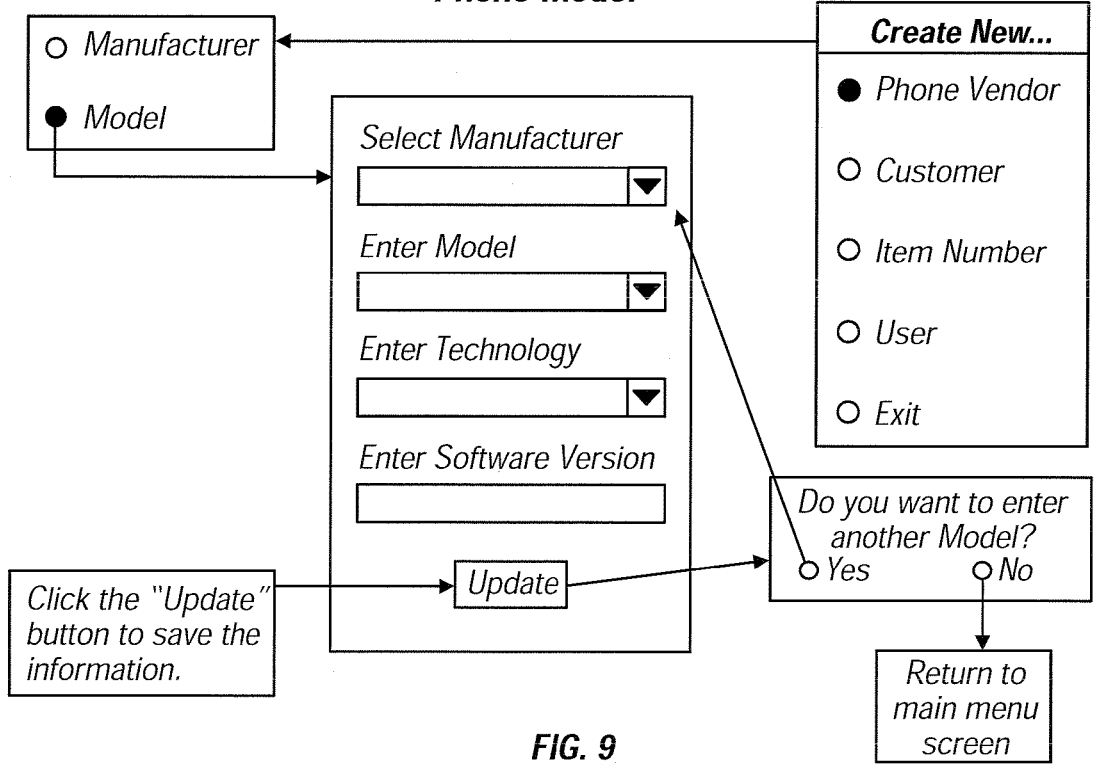
FIG. 9 shows a series of menu screens used as part of the Administrator Setup process for entering radiotelephone handset model information into the application software of FIG. 6 according to one embodiment of the present invention.
Figure 10:
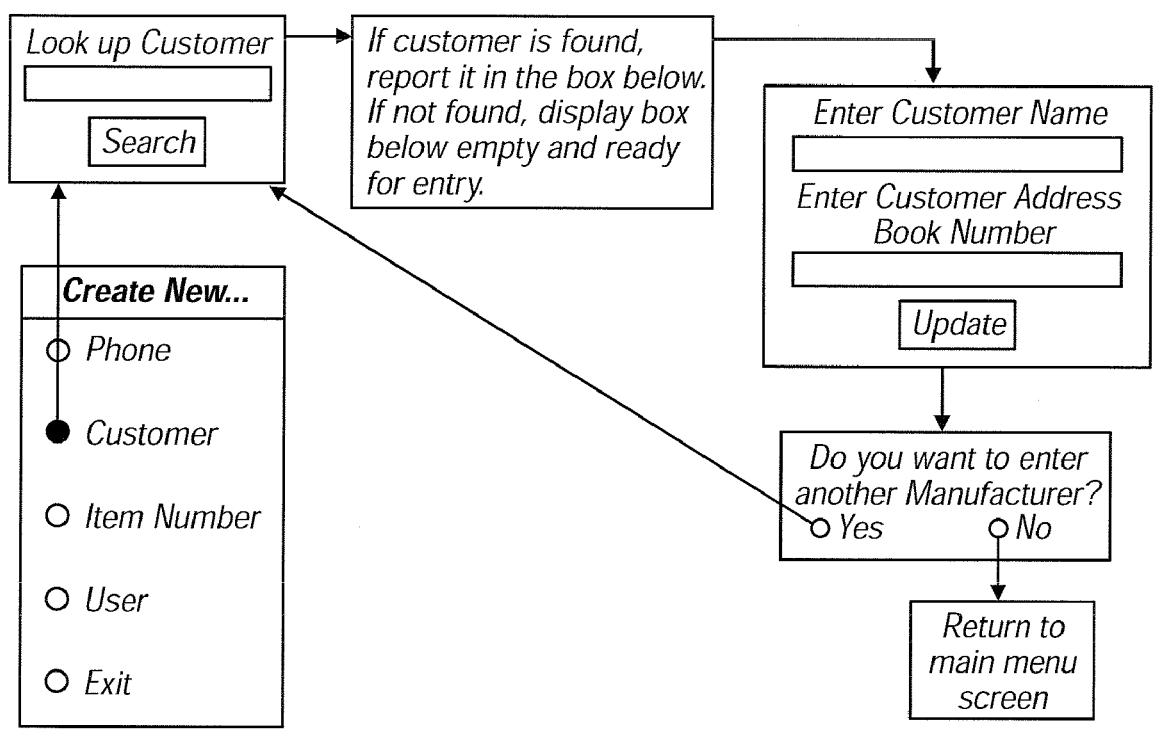
FIG. 10 shows a series of menu screens used as part of the Administrator Setup process for entering customer (service provider) information into the application software of FIG. 6 according to one embodiment of the present invention.
Figure 11:
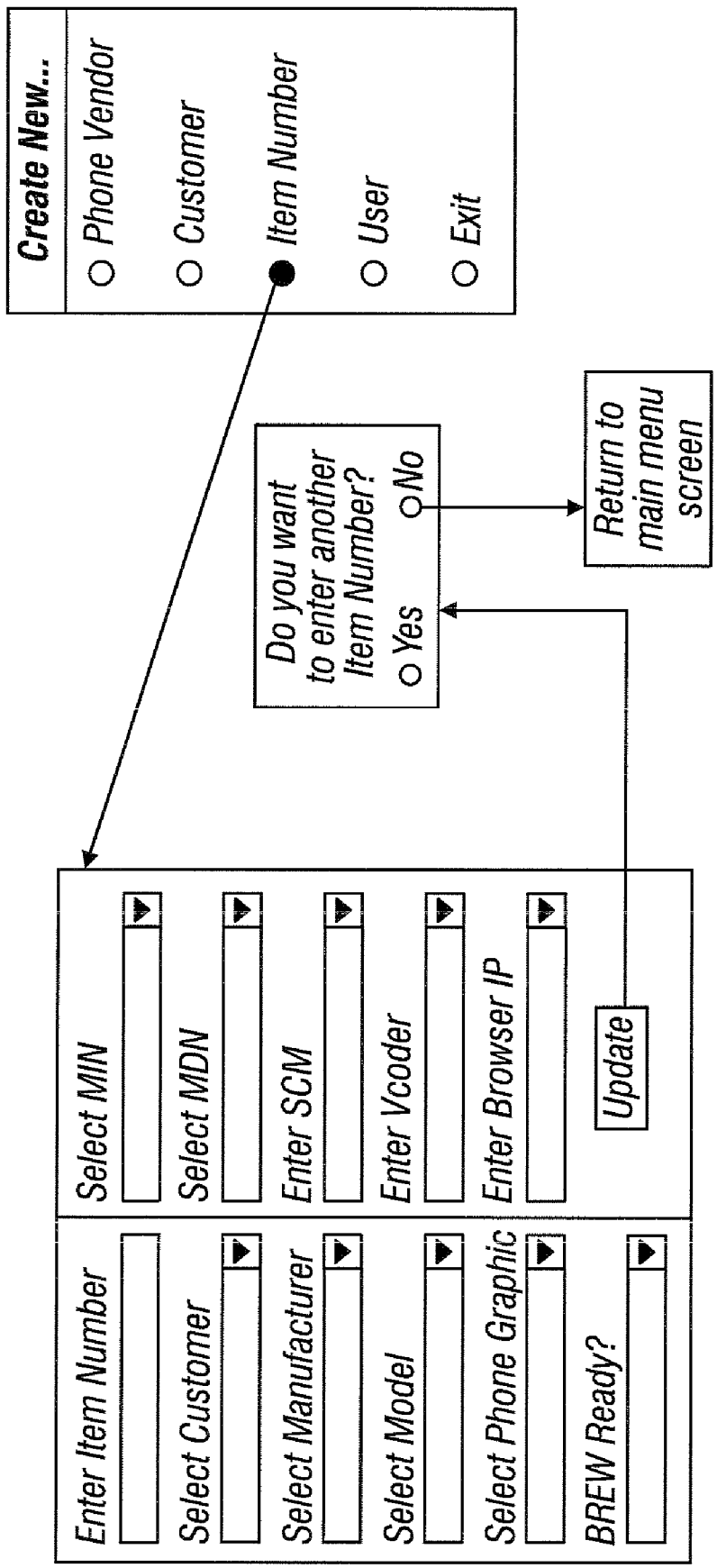
FIG. 11 shows a series of menu screens used as part of the Administrator Setup process for entering item number information into the application software of FIG. 6 according to one embodiment of the present invention.
Figure 12:
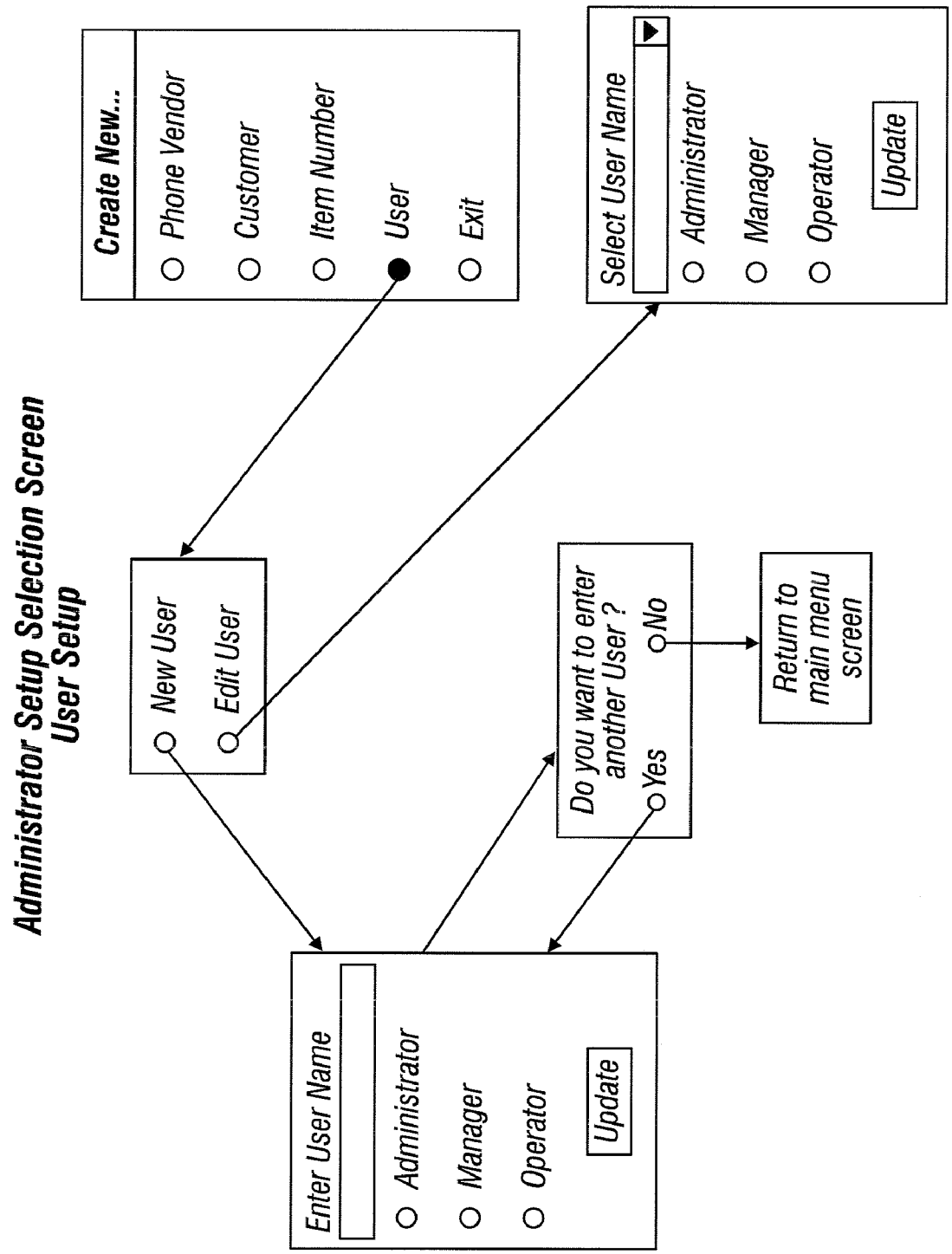
FIG. 12 shows a series of menu screens used as part of the Administrator Setup process for entering user information into the application software of FIG. 6 according to one embodiment of the present invention.

In FIG. 6, "Administrator" is selected. To enter the manager and operator functions discussed below, the user would make another appropriate selection in this screen. In FIG. 7 the Administrator Setup Main Screen offers choices of working in Administrator Setup Tables to define these data: Phone Manufacturer, Phone Model, Customer, Item Number, and User Setup. FIGS. 8–12 depict the respective Administrator Setup data entry screens.

EXAMPLE 3

Figure 13A:
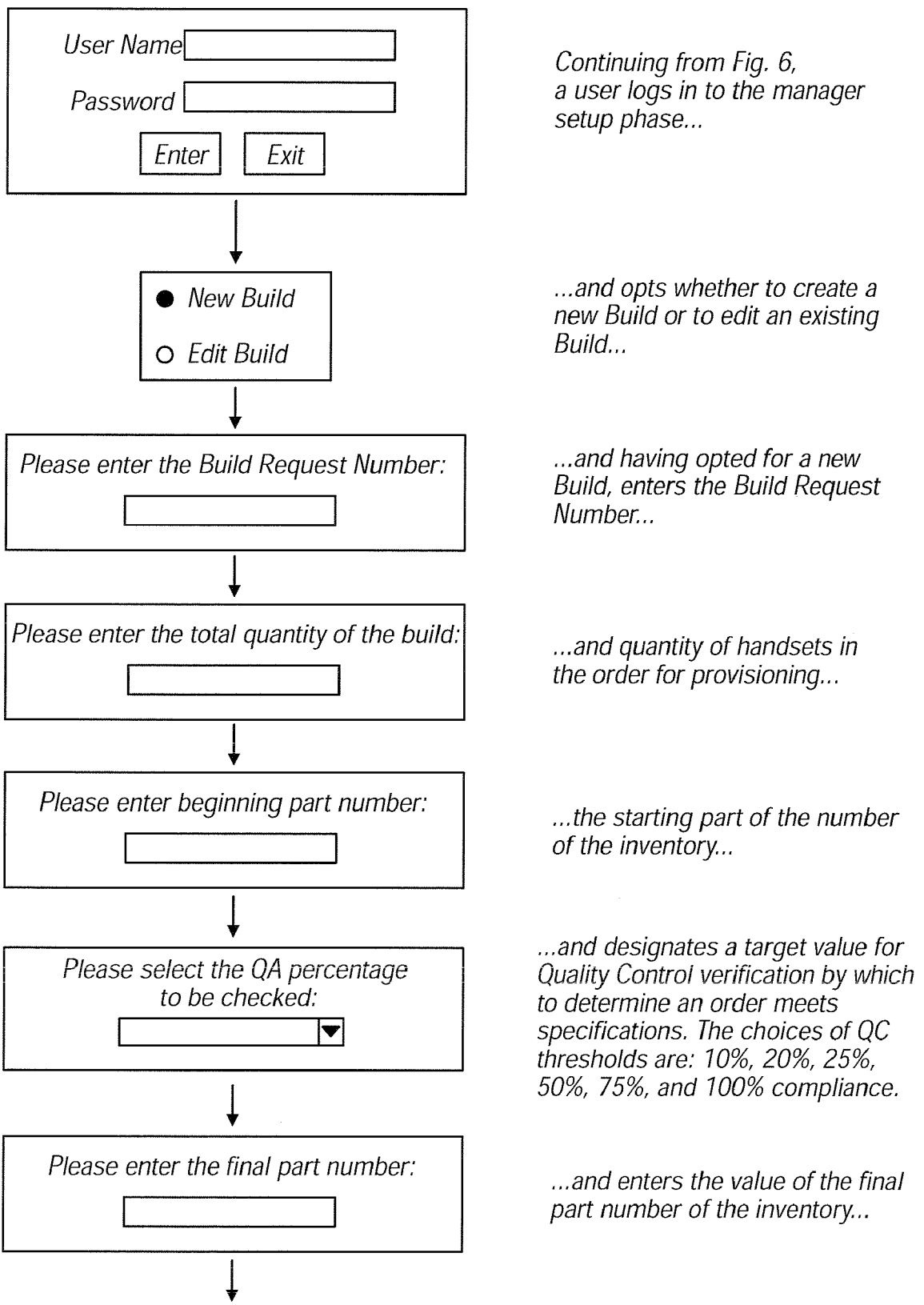
FIGS. 13A and 13B together show a series of menu screens used as part of the Manager Setup process to generate a new Build Request in the application software of FIG. 6 according to one embodiment of the present invention.
Figure 13B:
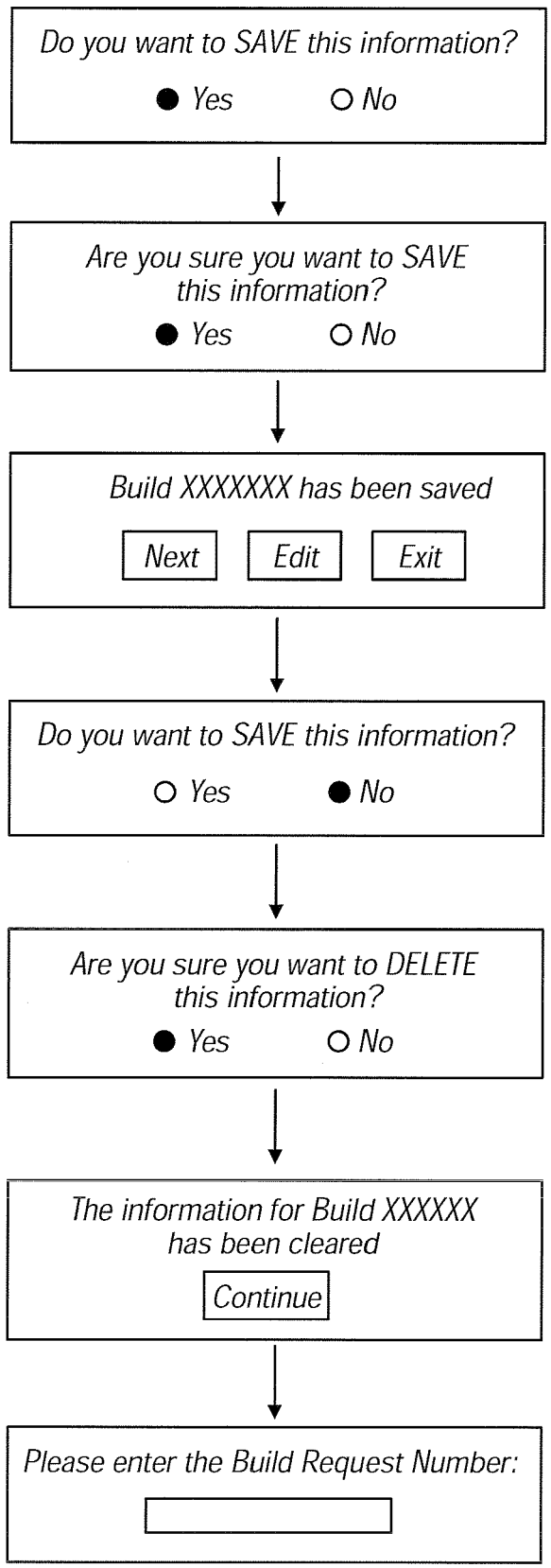
Figure 14A:
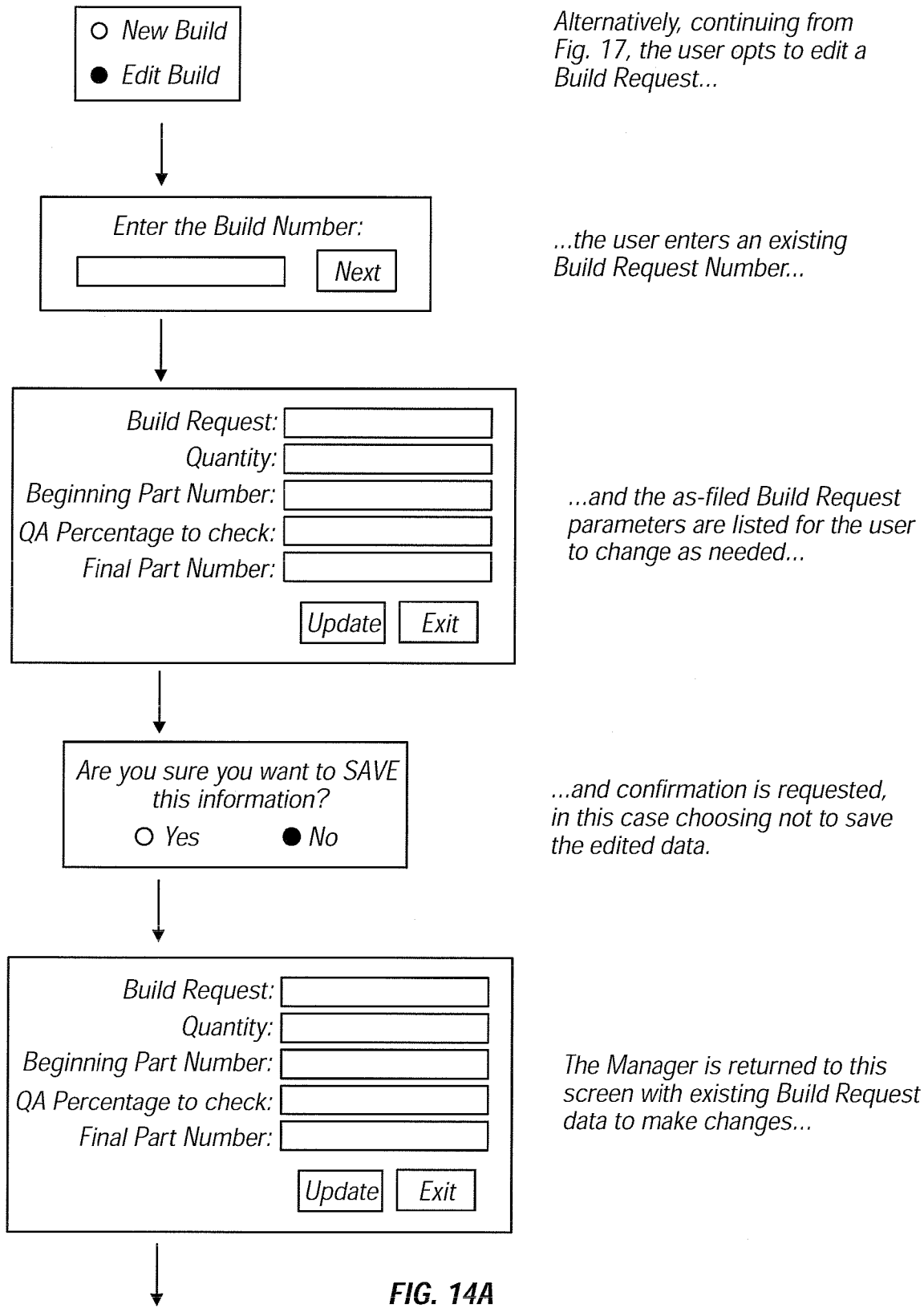
FIGS. 14A and 14B together show a series of menu screens used as part of the Manager Setup process to edit an existing Build Request in the application software of FIG. 6 according to one embodiment of the present invention.
Figure 14B:
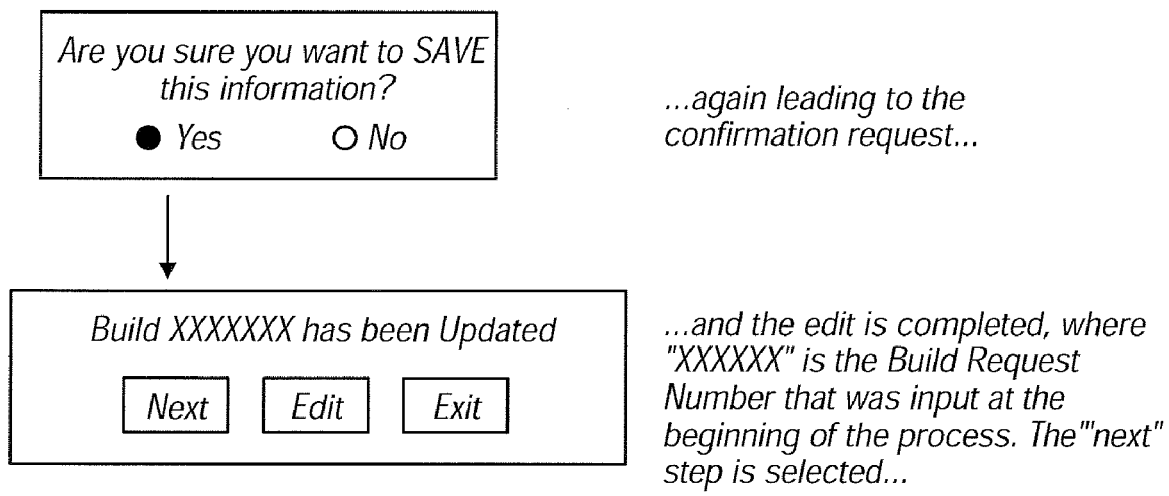

This example illustrates the flow logic for performing Manager Setup Phase tasks. The user enters the application software as described regarding FIG. 6 but selects the "manager" function. The application software will bring up a sequence of user screens depicted in FIG. 13, which shows the flow of the process of setting up a new Build Request. FIG. 14 shows an alternative screen sequence that enables a user to edit the Application Data Tables for an existing Build Request.

TABLE 1

Administrator Setup Table User Setup Table

| NAME | PASSWORD | DATE | LEVEL |
|---|---|---|---|
| admin1 | pw1 | Nov. 3, 2004 | Administrator |
| mgr1 | pw2 | Nov. 3, 2004 | Manager |
| user1 | pw3 | Nov. 3, 2004 | User |

TABLE 2

Administrator Setup Tables Item Number Setup Table

| NAM_SCM | BROWSER_IP | GRAPHIC | MIN | MDN | VCODER | BANNER | BREW |
|---|---|---|---|---|---|---|---|
| 246 | 192.268.0.1 | ISP1 | Default | Default | 2 | Brand1 | Ready |
| 246 | 150.255.4 | ISP2 | Default | Default | 2 | Brand2 | Ready |
| 246 | 0.0.0.0 | MFR1 | Default | Default | 2 | Brand3 | Not Ready |

TABLE 3

Application Data Tables Manager Build Request Setup

| BUILD REQUEST NO. | MANAGER | DATE | 1_PART_NUM | FINAL | TECH | SW_VER | PRL_VER |
|---|---|---|---|---|---|---|---|
| 800123 | mgr1 | Nov. 3, 2003 | 135212 | 135546 | CDMA | 2200.01.35 | 96 |
| 800321 | mgr1 | Nov. 3, 2003 | 135212 | 135214 | CDMA | 2200.01.35 | 50097 |
| 800546 | mgr1 | Nov. 3, 2003 | 135212 | 135557 | CDMA | 2200.01.35 | 400 |

| QA_% | CUSTOMER | MFG | MODEL | GRAPHIC | CUSTOMER | QUANTITY |
|---|---|---|---|---|---|---|
| 25 | ISP1 | MFR1 | MDL1 | GRAPHIC1 | ISP1 | 2500 |
| 20 | ISP2 | MER1 | MDL1 | GRAPHIC2 | ISP2 | 3500 |
| 100 | ISP3 | MER1 | MDL1 | GRAPHIC3 | ISP3 | 750 |

TABLE 4

Application Data Tables Application Collected Table - Operator Phase

| USER | TABLE | DATE_PRG | BUILD_PRG | TOTAL_PRG | QA_FAIL |
|---|---|---|---|---|---|
| user1 | A4 | NOV. 7, 2003 | 800123 | 1250 | 0 |
| user1 | C3 | NOV. 7, 2003 | 800321 | 523 | 0 |
| user1 | E7 | NOV. 7, 2003 | 800546 | 66 | 2 |

TABLE 5

Application Data tables Application Collected Table - QA Phase

| BUILD | ESN | PRL | SW | ESN_BOX | ESN_PHONE | BOX_LABEL | DATA_QA | BUILD REQUEST QA_REQUEST |
|---|---|---|---|---|---|---|---|---|
| 800123 | 13012345678 | PASS | PASS | 13012345678 | 13012345678 | 135546 | NOV. 7, 2003 | PASS |
| 800321 | 15965412365 | PASS | PASS | 15965412365 | 15965412365 | 135214 | NOV. 7, 2003 | PASS |
| 800546 | 25401258746 | FAIL | PASS | 25401258746 | 25401258746 | 135557 | NOV. 7, 2003 | PASS |

EXAMPLE 4

Figure 15B:
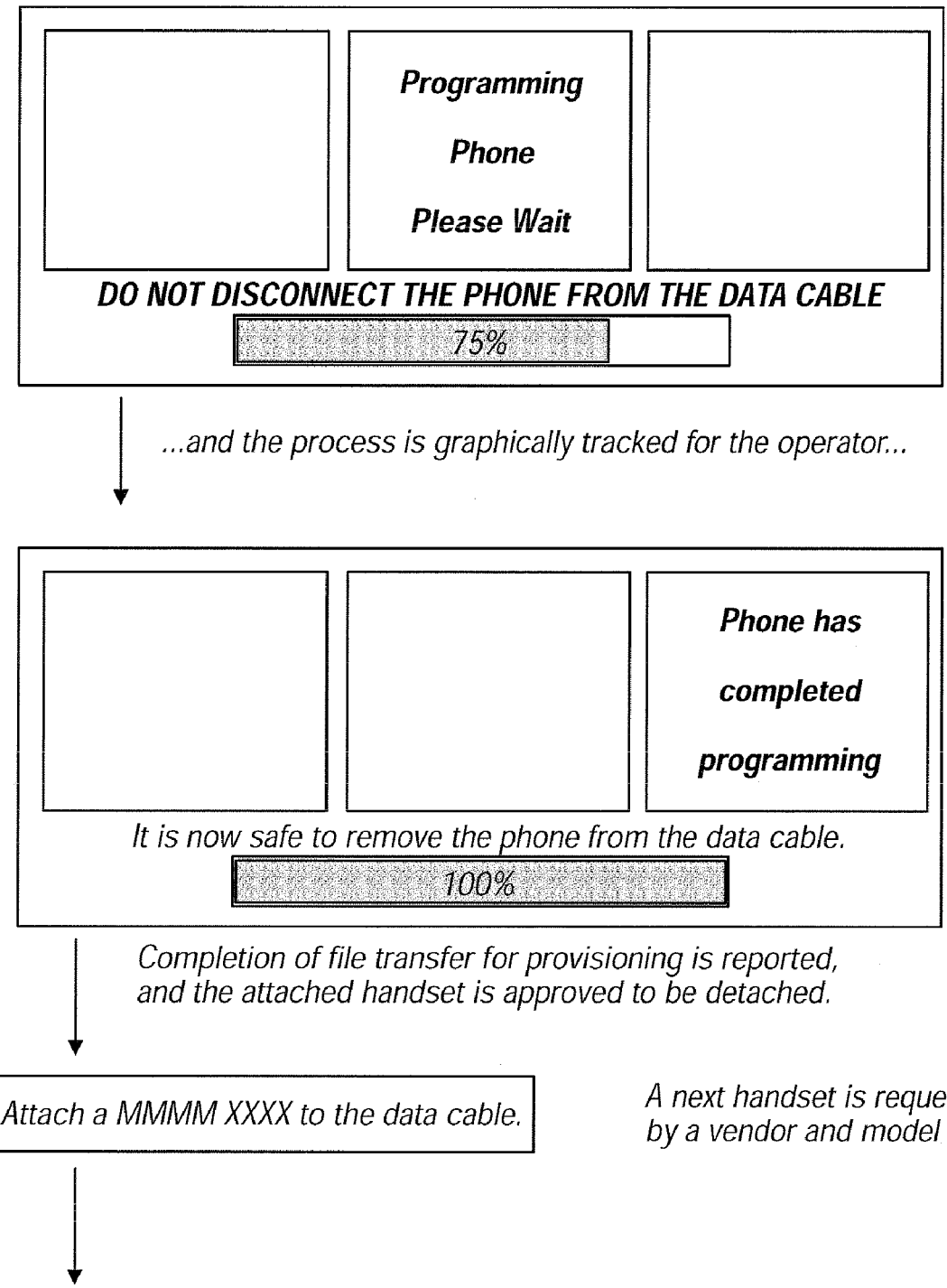
Figure 15C:
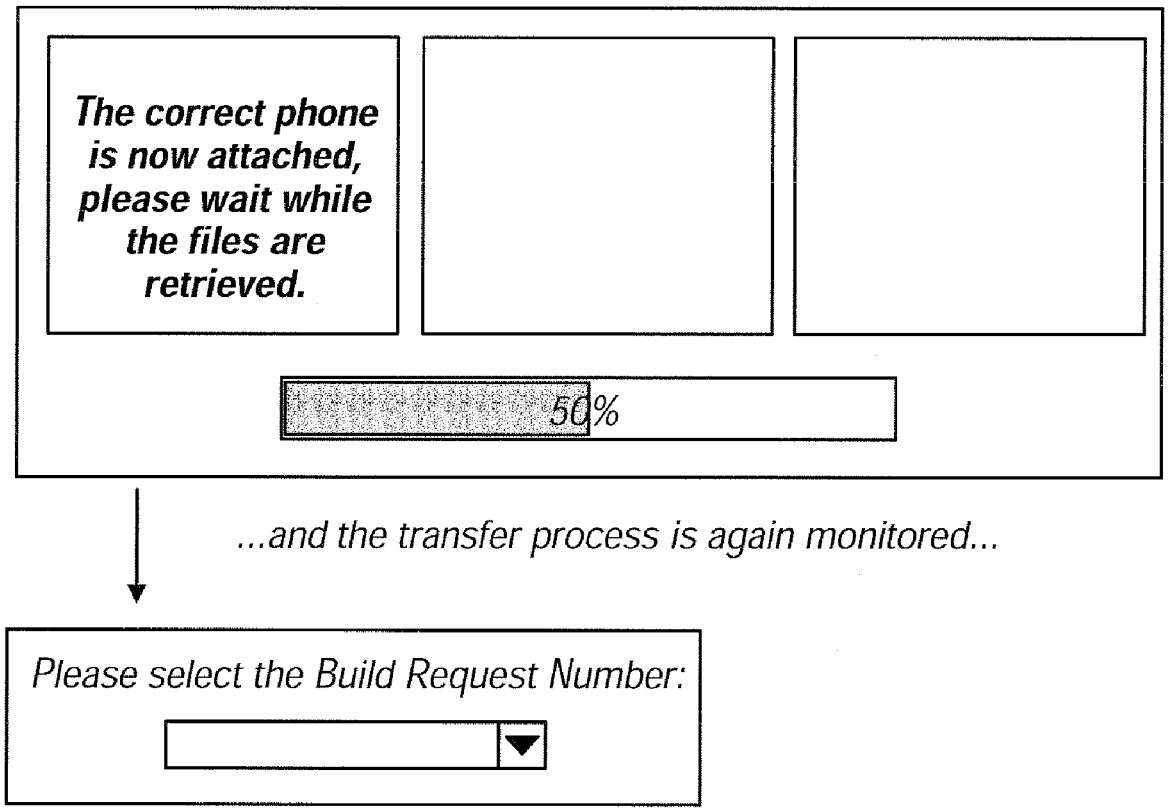

This example illustrates the flow logic for performing Operator Application Phase tasks. The user enters the application software as described regarding FIG. 6 but now selects the "operator" function. The application software will bring up a sequence of user screens shown in FIG. 15, which shows the flow of the process of selecting a Build Request and proceeding to provision phone units to fulfill the respective customer's order.

EXAMPLE 5

Figure 16C:
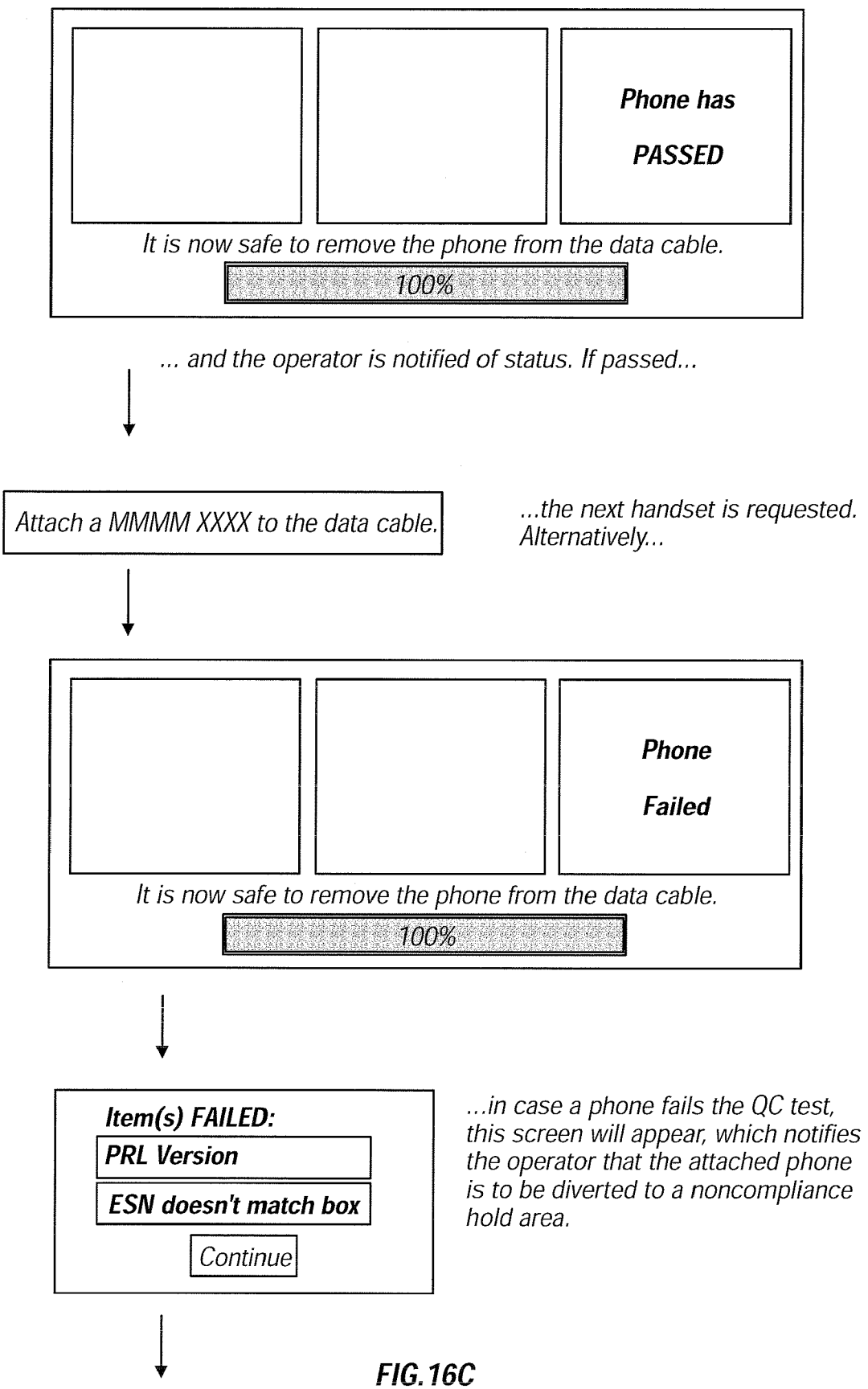
Figure 16D:
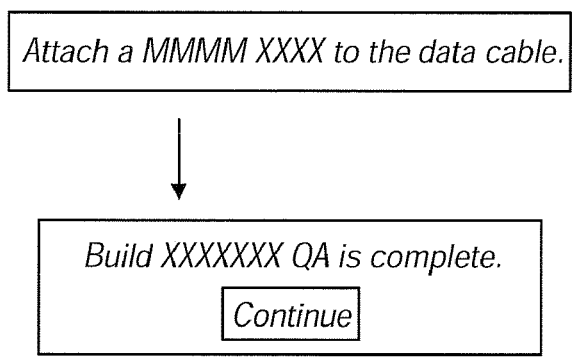

This example illustrates the flow logic for performing Quality Assurance Phase tasks. Quality Assurance is also a function performed by an operator. The user enters the application software as described regarding FIG. 6 but now selects the "QA" function. The application software will bring up a sequence of user screens shown in FIG. 16, which shows the flow of the process of selecting a Build Request and proceeding to apply the QA checking procedures to phone units provisioned for the respective customer's order.

The invention is described above with reference to non-limiting examples provided for illustrative purposes only. In view thereof, various modifications and changes will become apparent to one of ordinary skill in the art. The invention does not require that the application software to perform the inventive method be done in exactly the same way to still be within the spirit and scope of the invention. It is intended that all such changes and modifications are within the scope and spirit of the appended claims.

The invention claimed is:

1. An automated method of provisioning radiotelephone handset units, comprising:
 generating a build request comprising a radiotelephone handset specification and provisioning and instruction data for the specified handset;
 storing the build request in a memory storage medium in communication with a computerized provisioning system having a universal connector;
 retrieving data from the build request;

connecting the universal connector of the provisioning system to a handset in accordance with the build request specification;

automatically transferring the provisioning data to memory storage of the connected handset in accordance with the instruction data; and disconnecting the provisioned handset from the provisioning system;

wherein said build request generation comprises:
 entering a production build request number;
 entering a quantity of phones to provision;
 selecting a carrier type;
 selecting a customer;
 entering a starting part number;
 entering a final part number;
 selecting a handset manufacturer;
 selecting a handset technology; and
 selecting a handset manufacturer's model number.

2. The automated method of claim 1, wherein said generating and storing are performed on a workstation networked with said computerized provisioning system.

3. The automated method of claim 1 wherein the build request generation further comprises entering Service Provider Codes.

4. The automated method of claim 1 wherein the build request generation further comprises entering Authentication Keys.

5. An automated method of provisioning radiotelephone handset units comprising:

generating a build request comprising a radiotelephone handset specification and provisioning and instruction data for the specified handset;

storing the build request in a memory storage medium in communication with a computerized provisioning system having a universal connector;

retrieving data from the build request;

connecting the universal connector of the provisioning system to a handset in accordance with the build request specification;

automatically transferring the provisioning data to memory storage of the connected handset in accordance with the instruction data; and disconnecting the provisioned handset from the provisioning system;

wherein said data retrieval comprises:
 selecting a production build request number;
 displaying the final part number;
 displaying the handset manufacturer;
 displaying the handset manufacturer's model number;
 displaying an image of the handset model; and
 displaying the customer name.

6. An automated method of provisioning radiotelephone handset units, comprising:

generating a build request comprising a radiotelephone handset specification and provisioning and instruction data for the specified handset wherein the build request generation and storage are performed by a first person;

storing the build request in a memory storage medium in communication with a computerized provisioning system;

retrieving data from the build request wherein said data retrieval is performed by a second person and comprises:
 selecting a production build request number,
 displaying the final part number,
 displaying the handset manufacturer,
 displaying the handset manufacturer's model number,
 displaying an image of the handset model,
 displaying the customer name, or
 a combination thereof;

connecting the provisioning system to a handset in accordance with the build request specification wherein the data retrieval and handset connection are performed by the second person;

automatically transferring the provisioning data to memory storage of the connected handset in accordance with the instruction data; and disconnecting the provisioned handset from the provisioning system.

7. An automated method of provisioning radiotelephone handset units, comprising:

generating a build request comprising a radiotelephone handset specification and provisioning and instruction data for the specified handset;

storing the build request in a memory storage medium in communication with a computerized provisioning system having a universal connector;

retrieving data from the build request;

connecting the universal connector of the provisioning system to a handset in accordance with the build request specification;

automatically transferring the provisioning data to memory storage of the connected handset in accordance with the instruction data;

disconnecting the provisioned handset from the provisioning system; and inspecting the memory storage of the handset to verify provisioning data integrity.

8. The automated method of claim 7 further comprising:
storing data gathered from the verification step of claim 7 and generating reports based on the data.

9. An automated method of provisioning radiotelephone handset units, comprising:

generating a build request comprising a radiotelephone handset specification and provisioning and instruction data for the specified handset;

storing the build request in a memory storage medium in communication with a computerized provisioning system;

retrieving data from the build request;

connecting the provisioning system to a handset in accordance with the build request specification wherein said handset connection is at a first work station and the inspection is effected for a plurality of the provisioned handsets at a second work station and includes:
 entering a production build request number,
 connecting a provisioned handset selected from said plurality of provisioned handsets according to the build request data associated with the production build request number,
 comparing the provisioning information in the memory storage of the provisioned handset to the provisioning data associated with the production build request number,
 marking the handset with a passing indicator if the provisioning information matches the provisioning data,
 marking the handset with a failed indicator if the provisioning information differs from the provisioning data,
 repeating the connection, comparison, and marking on additional handsets for the production build request number,
 determining whether the production build request passes or fails based on the instruction data associated with the production build request number and returning a pass/fail for the production build request,
 sending failed handsets from a passing production build request to a repair station, and sending handsets from a failing production build request to an area for segregation;
automatically transferring the provisioning data to memory storage of the connected handset in accordance with the instruction data;
inspecting the memory storage of the handset to verify provisioning data integrity; and
disconnecting the provisioned handset from the provisioning system.

10. The automated method of claim 9 wherein the determination of whether the production build request passes or fails is in accordance with ANSI Quality tables for inspection under ANSI Z 1.4.

11. An automated method of provisioning a plurality of radiotelephone handset units, comprising:
generating a plurality of build requests comprising radiotelephone handset specification data and provisioning and instruction data for the specified handset;
storing the build requests in a memory storage medium in communication with a computerized provisioning system;
selecting an available one of the build requests from the storage medium;
displaying handset specification data from the selected build request;
connecting the provisioning system to a handset in accordance with the specification data display;
querying the connected handset via the provisioning system to compare connected handset specification data with the build request specification data; and
automatically transferring the provisioning data to memory storage of the connected handset in accordance with the instruction data.

12. The automated method of claim 11, wherein said generation and storage are performed on a workstation networked with the computerized provisioning system.

13. The automated method of claim 11, wherein said generation further comprises:
entering a production build request number;
inputting a quantity of phones to provision;
selecting a carrier type;
selecting a customer;
entering a starting part number;
entering a final part number;
selecting a handset manufacturer;
selecting a handset technology;
selecting a handset manufacturer's model number; or
a combination thereof.

14. The automated method of claim 11 wherein the build request generation further comprises entering Service Provider Codes.

15. The automated method of claim 11 wherein the build request generation further comprises entering Authentication Keys.

16. The automated method of claim 11, wherein the display comprises:
displaying a final part number;
displaying a handset manufacturer;
displaying a model number of the handset manufacturer;
displaying an image of the handset model;
displaying a customer name; or
a combination thereof.

17. The automated method of claim 11, wherein said querying comprises:
communicating with the connected handset;
determining manufacturer and model number of said handset;
comparing the manufacturer and model number of the connected handset with the requested manufacturer and model number; and continuing the provisioning or displaying instructions to the operator to connect a different handset based on the result of the comparison.

18. The method of claim 11 further comprising:
inspecting the memory storage of the automatically provisioned handset to verify provisioning data integrity.

19. The automated method of claim 18 further comprising:
storing data gathered from the verification step of claim 18 and generating reports based on the data.

20. The automated method of claim 18 wherein said inspection includes:
entering a production build request number;
connecting the provisioned handset according to the build request data associated with the production build request number;
comparing the provisioning information in the memory storage of the connected handset to the provisioning data associated with the production build request number;
marking the handset with a passing indicator if the provisioning information matches the provisioning data;
marking the handset with a failed indicator if the provisioning information differs from the provisioning data;
repeating the connection, comparison, and marking for additional handsets for the production build request number;
determining whether the production build request passes or fails based on the instruction data associated with the production build request number and returning a pass/fail for the production build request;
sending failed handsets from a passing production build request to a repair station; and
sending handsets from a failing production build request to an area for segregation.

21. The automated method of claim 20 wherein determination of whether the production build request passes or fails is in accordance with ANSI Quality tables under ANSI Z 1.4.

22. A method for provisioning radiotelephone handset units of varying model, manufacturer, and platform, comprising:
connecting a radiotelephone handset to a universal connector interface having at least one universal connector adapted for connection to radiotelephone handsets having different specifications;
operably connecting the universal connector interface to a computer in communication with a memory storage medium containing provisioning and instruction data for the radiotelephone handset connected via the universal connector interface;
executing software for verifying connection of the connected radiotelephone handset and automatically transferring provisioning data to handset memory storage via the universal connector interface in accordance with the instruction data;
generating a plurality of build requests comprising radiotelephone handset specification data and provisioning and instruction data for each specified handset;
storing the build requests in the memory storage medium;
selecting an available build request from the memory storage medium;
displaying handset specification data from the selected build request; and
querying the connected handset via the universal provisioning interface and comparing the connected handset specification data with the build request specification data.

* * * * *